United States Patent
Saber et al.

(10) Patent No.: US 12,232,142 B2
(45) Date of Patent: *Feb. 18, 2025

(54) SYSTEM AND METHOD FOR PHYSICAL DOWNLINK CONTROL CHANNEL MONITORING BASED ON USER EQUIPMENT CAPABILITY IN DUAL CONNECTIVITY

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,214

(22) Filed: Aug. 7, 2023

(65) Prior Publication Data

US 2023/0413280 A1 Dec. 21, 2023

Related U.S. Application Data

(63) Continuation of application No. 17/029,853, filed on Sep. 23, 2020, now Pat. No. 11,723,035.

(Continued)

(51) Int. Cl.
*H04W 72/04* (2023.01)
*H04W 8/24* (2009.01)
(Continued)

(52) U.S. Cl.
CPC .......... *H04W 72/23* (2023.01); *H04W 8/24* (2013.01); *H04W 72/51* (2023.01)

(58) Field of Classification Search
CPC ....... H04W 72/23; H04W 8/24; H04W 72/51; H04W 24/10; H04W 72/0446;
(Continued)

(56) References Cited

U.S. PATENT DOCUMENTS

2021/0168774 A1* 6/2021 Li .................... H04W 16/14
2021/0022120 A1 9/2021 Salah
(Continued)

OTHER PUBLICATIONS

ETSI TS 138 213 V15.3.0 (Oct. 2018) 5G; NR; Physical layer procedures for control, 3GPP TS 38.213 version 15.3.0 (Release 15), pp. 102.

(Continued)

*Primary Examiner* — John D Blanton
(74) *Attorney, Agent, or Firm* — The Farrell Law Firm, P.C.

(57) ABSTRACT

Methods and apparatuses are provided in which a UE reports capability information indicating a first set of pairs and a second set of tuples. Each pair indicates serving cells configured for per-slot and per-span monitoring. Each tuple indicates serving cells configured for per-slot and per-span monitoring in an MCG and an SCG. A first pair of values for the MCG and a second pair of values for the SCG are received. A first value in each pair is a maximum number of serving cells configured for per-slot monitoring, and a second value in each pair is a maximum number of serving cells configured for per-span monitoring. A monitored candidate limit per slot is determined for the MCG and the SCG based on the first value. A monitored candidate limit per span is determined for the MCG and the SCG based on the second value.

21 Claims, 5 Drawing Sheets

Related U.S. Application Data

(60) Provisional application No. 63/033,193, filed on Jun. 1, 2020.

(51) Int. Cl.
*H04W 72/23* (2023.01)
*H04W 72/51* (2023.01)

(58) Field of Classification Search
CPC .. H04W 72/0453; H04W 76/15; H04L 5/001; H04L 5/0098; H04L 5/0053
See application file for complete search history.

(56) References Cited

U.S. PATENT DOCUMENTS

| | | | |
|---|---|---|---|
| 2021/0282120 A1* | 9/2021 | Salah | H04L 5/0098 |
| 2021/0321366 A1* | 10/2021 | Hosseini | H04L 5/0092 |
| 2021/0360593 A1* | 11/2021 | Hosseini | H04W 76/15 |
| 2022/0159631 A1* | 5/2022 | Yi | H04L 5/0053 |

OTHER PUBLICATIONS

3rd Generation Partnership Project; Technical Specification Group Radio Access Network: NR; User Equipment (UE) feature list (Release 15), Jun. 2019, pp. 64.

CATT, "Discussion of UE Features for NR URLLC/IIot", R1-2003606, 3GPP TSG RAN WG1 Meeting #101, May 25-Jun. 5, 2020, 10 pages.

ZTE, "Remain Issues on PDCCH Enhancements for NR URLLC", R1-2000355, 3GPP TSG RAN WG1 #100, Feb. 24-Mar. 6, 2020, 9 pages.

3GPP, 3rd Generation Partnership Project; Technical Specification Group Radio Access Network; NR; Physical Layer Procedures for Control, (Release 16), 3GPP TS 38.213 V16.1.0, Mar. 2020, 156 pages.

European Search Report dated Sep. 1, 2021 Issued in counterpart application No. 21159881.8-1215, 8 pages.

* cited by examiner

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

FIG. 2A

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

FIG. 2B

| UE capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | MO | | | | | | | | | | | | ■ | | ■ |
| | MO | | ■ | | | | | | | | | | | | |
| (2,2)and(4,3)and(7,3) | Span | □ | | | □ | | | | | | | □ | □ | □ | |
| (2,1)and(4,3)and(7,3) | Span | □ | | | □ | | | | | | | □ | □ | □ | |

FIG. 3

RRC table for $(Y, Z, W) = (2, 3, 4)$

| Index | $(y, z)$ |
|---|---|
| 0 | (1,1) |
| 1 | (1,2) |
| 2 | (1,3) |
| 3 | (2,1) |
| 4 | (2,2) |

FIG. 4A

RRC table for $(Y, Z, W) = (3, 3, 4)$

| Index | $(y, z)$ |
|---|---|
| 0 | (1,1) |
| 1 | (1,2) |
| 2 | (1,3) |
| 3 | (2,1) |
| 4 | (2,2) |
| 5 | (3,1) |

FIG. 4B

SYSTEM AND METHOD FOR PHYSICAL DOWNLINK CONTROL CHANNEL MONITORING BASED ON USER EQUIPMENT CAPABILITY IN DUAL CONNECTIVITY

PRIORITY

This application is a Continuation Application of U.S. application Ser. No. 17/029,853, filed in the U.S. Patent and Trademark Office (USPTO) on Sep. 23, 2020, which is based on and claims priority under 35 U.S.C. § 119(e) to a U.S. Provisional Patent Application filed on Jun. 1, 2020 in the USPTO and assigned Ser. No. 63/033,193, the content of which is incorporated herein by reference.

FIELD

The present disclosure relates generally to channel monitoring, and more particularly, to physical downlink control channel (PDCCH) monitoring based on user equipment (UE) capability.

BACKGROUND

Dual connectivity (DC) was introduced in $3^{rd}$ Generation Partnership Project (3GPP) Release 12 (Rel-12) for small cell enhancement. DC allows a UE to simultaneously transmit and receive data on multiple component carriers from two cell groups (CGs) via a master node and a secondary node. DC can increase user throughput, provide mobility robustness, and support load-balancing among eNBs. Compared to single connectivity, DC can provide higher per-user throughput by offloading data from a master node to a secondary node when the master node is overloaded.

In a typical scenario, a UE is first connected to the master node, and then connects to the secondary node. Evolved universal mobile telecommunications system (UMTS) terrestrial radio access network (E-UTRAN) refers to $4^{th}$ Generation (4G) or Long Term Evolution (LTE). E-UTRAN-New Radio (NR)-DC (EN-DC), NR-E-UTRA (NE)-DC, and NR-NR-DC (NN-DC) refer to the DC scenarios where the master node and secondary nodes are (eNB, next generation node B (gNB)), (gNB, eNB), and (gNB, gNB), respectively. eNB is used to define a node for 4G/LTE and gNB is used to define a node for 5G/NR. Rel-15 supports EN-DC, NE-DC, and NN-DC (or NR-DC). Deployment scenarios where the nodes are of different radio access technologies (RATs) are referred to as multi-RAT DC (MR-DC). NE-DC and EN-DC are two examples of MR-DC.

FIG. 1 is a diagram illustrating an NN-DC deployment scenario. UE-1 102 is connected to a single NR node (gNB), specifically, master gNB (MgNB) 104. UE-2 106 is also connected to a single NR node (gNB), specifically, secondary gNB-2 (SgNB-2) 108. UE-3 110 is simultaneously connected to two NR nodes (gNBs), specifically, MgNB 104 and SgNB-1 112. The MgNB configures a set of serving cells within a master cell group (MCG) and each SgNB configures a set of serving cells within a respective secondary cell group (SCG). The primary cell of the MCG is referred to as a PCell, while the secondary cells of the MCG are referred to as SCells. The primary cell of the SCG is referred to as a PSCell. PCells and PSCells are also referred to as special cells (SpCell)

In mobile communication systems, a UE may report one or more capabilities to a base station, a NodeB, or the like. For example, a UE may report capabilities relating to blind detection (BD) and/or control channel elements (CCE).

According to 3GPP $5^{th}$ Generation (5G) Release 15 (Rel-15) of new radio (NR) technology, a UE that supports a carrier aggregation (CA) may report a capability for blind detection (BD) of PDCCH over a certain number of serving cells or component carriers (CCs). The capability signaling may be referred to as pdcch-BlindDetection, which may be in form of an integer ranging from 4 to 16. This capability helps to define a maximum number of serving cells ($N_{cells}^{cap} \geq 4$) for which the UE can support PDCCH BD and non-overlapped CCE.

Rel-15 BD/CCE limits are defined per slot. FIG. 2A illustrates table showing a maximum number of BD ($M_{PDCCH}^{max,slot,\mu}$) that the UE is able to perform per slot for operation with a single serving cell based on subcarrier spacing (SCS) configuration ($\mu$) of the serving cell. FIG. 2B illustrates a table showing a maximum number of non-overlapped CCE ($C_{PDCCH}^{max,slot,\mu}$) that the UE is able to monitor per slot for operation with a single serving cell based on SCS configuration ($\mu$) of the serving cell.

According to 3GPP 5G Release 16 (Rel-16) of NR technology, increased PDCCH monitoring per slot may be supported by defining per-span limits. Generally, a span is defined as time unit within and smaller than a slot. A span pattern in a slot may be defined by a next generation NodeB (gNB), according to a search space configuration. FIG. 3 is a diagram illustrating a span pattern in a slot. Specifically, monitoring occasions (MOs) are shown in symbols 1, 5, 9, 11, and 13, and a span pattern is defined based on a UE capability that defines a minimum spacing between the beginning symbols of each span, and a number of symbols in each span. For example, span patterns based on capabilities (2, 2) and (2, 1) are illustrated in FIG. 3.

Similar to the tables of FIGS. 2A and 2B, Rel-16 provides tables in which BD/CCE limits are defined per span. The BD/CCE limits are defined for single cell operation as a function of the SCS configuration of the active bandwidth part (BWP) of the cell.

A Rel-16 UE may perform the BD/CCE monitoring according to per-slot limits or per-span limits. For a UE operating with CA, all the configured serving cells may follow per-slot monitoring limits and the UE may report pdcch-BlindDetectionCA, all the configured serving cells may follow per-span monitoring limits and the UE may report pdcch-BlindDetectionCA-R16, or some serving cells may be configured with per-slot monitoring limits and some serving cells may be configured with per-span monitoring limits and the UE may report a pair (pdcch-BlindDetectionCA-R15, pdcch-BlindDetectionCA-R16).

When serving cells are configured with per-slot and per-span monitoring limits, a constraint may be placed on the reported pair, as set forth in Equation (1) below.

$$\text{pdcch-BlindDetectionCA-}R15 + \text{pdcch-BlindDetectionCA-}R16 \leq 4 \qquad (1)$$

For example, the UE may report the pair (1, 3), which indicates that the UE supports up to one cell with per-slot BD/CCE monitoring and up to 3 cells with per-span BD/CCE monitoring. However, the UE may also support monitoring with respect to the pair (3, 1). In order for a UE to indicate its supports for both pairs, the UE would need to report the pair (3, 3), which is not possible given the constraint noted in Equation 1 (i.e., 3+3=6>4).

SUMMARY

According to one embodiment, a method is provided for monitoring a PDCCH, by a UE. The UE reports capability information indicating a first set of one or more pairs and a second set of one or more tuples. Each of pair of the one or more pairs indicates a combination of serving cells configured for per-slot and per-span monitoring that the UE is capable of supporting. Each tuple of the one or more tuples indicates a combination of serving cells configured for per-slot and per-span monitoring that the UE is capable of supporting in each of a master cell group (MCG) and a secondary cell group (SCG). A first pair of values for the MCG and a second pair of values for the SCG are received in response to the capability information. A first value in each of the first and second pairs of values is a maximum number of serving cells configured for per-slot monitoring, and a second value in each of the first and second pairs of values is a maximum number of serving cells configured for per-span monitoring. A monitored candidate limit per slot is determined for each of the MCG and the SCG based on the first value in each of the first and second pairs of values. A monitored candidate limit per span is determined for each of the MCG and the SCG based on the second value in each of the first and second pairs of values.

According to one embodiment, a method is provided for monitoring a PDCCH, by a BS. The BS receives, from a UE, capability information indicating a first set of one or more pairs and a second set of one or more tuples. Each pair of the one or more pairs indicates a combination of serving cells configured for per-slot and per-span monitoring that the UE is capable of supporting. Each tuple of the one or more tuples indicates a combination of serving cells configured for per-slot and per-span monitoring that the UE is capable of supporting in each of an MCG and an SCG. The BS provides a first pair of values for the MCG and a second pair of values for the SCG in response to the capability information. A first value in each of the first and second pairs of values is a maximum number of serving cells configured for per-slot monitoring, and a second value in each of the first and second pairs of values is a maximum number of serving cells configured for per-span monitoring. A monitored candidate limit per slot is determined for each of the MCG and the SCG based on the first value in each of the first and second pairs of values. A monitored candidate limit per span is determined for each of the MCG and the SCG based on the second value in each of the first and second pairs of values.

According to one embodiment, a UE is provided that includes a processor and a non-transitory computer readable storage medium storing instructions. When executed, the instructions cause the processor to report capability information indicating a first set of one or more cells and a second set of one or more tuples, wherein each pair of the one or more pairs indicates a combination of serving cells configured for per-slot and per-span monitoring that the UE is capable of supporting, and each tuple of the one or more tuples indicates a combination of serving cells configured for per-slot and per-span monitoring that the UE is capable of supporting in each of an MCG and an SCG; receive a first pair of values for the MCG and a second pair of values for the SCG, in response to the capability information, wherein a first value in each of the first and second pairs of values is a maximum number of serving cells configured for per-slot monitoring, and a second value in each of the first and second pairs of values is a maximum number of serving cells configured for per-span monitoring; determine, for each of the MCG and the SCG, a monitored candidate limit per slot based on the first value in each of the first and second pairs of values; and determine, for each of the MCG and the SCG, a monitored candidate limit per span based on the second value in each of the first and second pairs of values.

According to one embodiment, a BS is provided that includes a processor and a non-transitory computer readable storage medium storing instructions. When executed, the instructions cause the processor to receive, from a UE, capability information indicating a first set of one or more pairs and a second set of one or more tuples, wherein each pair of the one or more pairs indicates a combination of serving cells configured for per-slot and per-span monitoring that the UE is capable of supporting, and each tuple of the one or more tuples indicates a combination of serving cells configured for per-slot and per-span monitoring that the UE is capable of supporting in each of an MCG and an SCG; and provide a first pair of values for the MCG and a second pair of values for the SCG, in response to the capability information, wherein a first value in each of the first and second pairs of values is a maximum number of serving cells configured for per-slot monitoring, and a second value in each of the first and second pairs of values is a maximum number of serving cells configured for per-span monitoring. A monitored candidate limit per slot is determined for each of the MCG and the SCG based on the first value in each of the first and second pairs of values. A monitored candidate limit per span is determined for each of the MCG and the SCG based on the second value in each of the first and second pairs of values.

According to one embodiment, a method is for monitoring a PDCCH by a UE in which capability information indicating a set of one or more tuples is reported. Each tuple of the set indicates a combination of serving cells configured for per-slot and per-span monitoring that the UE is capable of supporting in each of an MCG and an SCG. In response to the capability information, a first pair of values for the MCG and a second pair of values for the SCG are received. A first value in each of the first and second pairs of values is a maximum number of serving cells configured for per-slot monitoring, and a second value in each of the first and second pairs of values is a maximum number of serving cells configured for per-span monitoring. A monitored candidate limit per slot is determined for each of the MCG and the SCG, based on the first value in each of the first and second pairs of values. A monitored candidate limit per span is determined for each of the MCG and the SCG, based on the second value in each of the first and second pairs of values.

BRIEF DESCRIPTION OF THE DRAWINGS

The above and other aspects, features, and advantages of certain embodiments of the present disclosure will be more apparent from the following detailed description, when taken in conjunction with the accompanying drawings, in which:

FIG. 2A is a table showing a maximum number of BD ($M_{PDCCH}^{max,slot,\mu}$) that the UE is able to perform per slot for operation with a single serving cell based on subcarrier spacing (SCS) configuration ($\mu$) of the serving cell;

FIG. 2B is a table showing a maximum number of non-overlapped CCE ($C_{PDCCH}^{max,slot,\mu}$) that the UE is able to monitor per slot for operation with a single serving cell based on SCS configuration ($\mu$) of the serving cell;

FIG. 3 is a diagram illustrating a span pattern in a slot;

FIG. 4A is an RRC table corresponding to 3-tuple (Y, Z, W)=(2,3,4), according to an embodiment FIG. 4B is an RRC table corresponding to 3-tuple (Y, Z, W)=(3,3,6), according to an embodiment;

DETAILED DESCRIPTION

Figure 1:
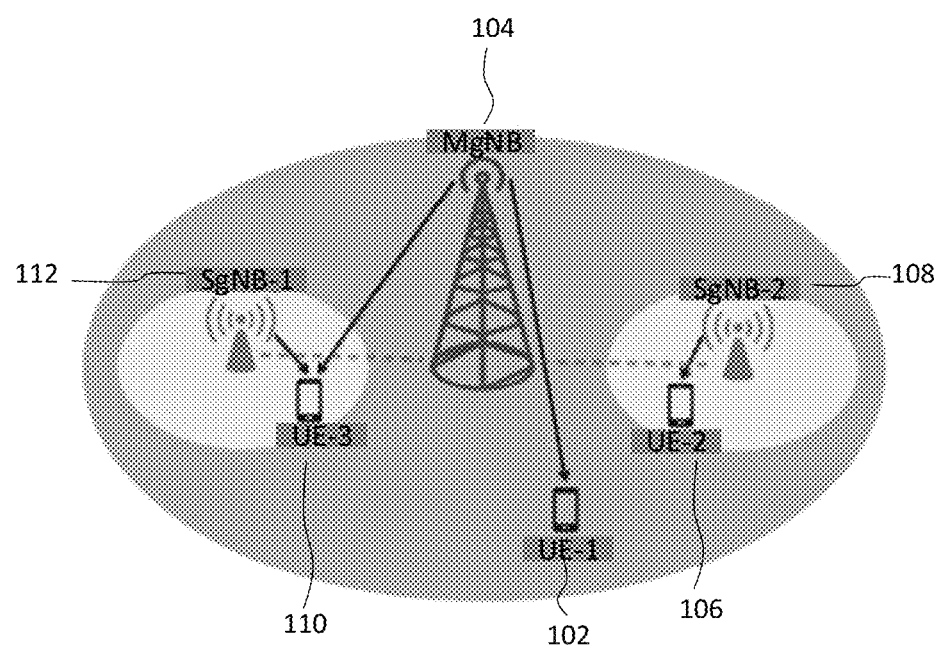
FIG. 1 is a diagram illustrating an NN-DC deployment scenario.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to embodiments of the present disclosure, a UE may report multiple pairs of (pdcch-BlindDetectionCA-R15, pdcch-BlindDetectionCA-R16) to provide information on its ability to support different configurations of a number of serving cells configured with per-slot monitoring and a number of serving cells configured with per-span monitoring. Alternatively, a UE may report a single pair (pdcch-BlindDetectionCA-R15, pdcch-BlindDetectionCA-R16) as ($Y_1$, $Z_1$), and other values of ($Y_i$, $Z_i$) representing UE capability may be determined based on a functional relationship ($Y_i$, $Z_i$)=$f(Y_1, Z_1)$. One such functional relationship may be $Y_i=Y_1-a$ and $Z_i=Z_1+a/b$, where a is a multiple of b. In such a case, and depending on implementation details, b may represent more complex span-based monitoring than slot-based monitoring.

Since the UE determines the maximum BD/CCE limits per span and per slot according to a maximum number of cells with such limits ($N_{cells}^{cap}$), the UE may be expected to be provided with the respective $N_{cells}^{cap}$ by the gNB. Specifically, after the UE has reported multiple pairs, as described above, the gNB may indicate to the UE which pair has been chosen, from which the UE determines BD/CCE limits per span and per slot.

Additionally or alternatively, according to an embodiment, the gNB may not indicate a pair to the UE. One or more BD/CCE limits may be used at the UE to perform a candidate dropping operation if the configured number of monitoring candidates exceeds a limit. Hence, if the gNB ensures that no such excess occurs for at least one pair that the UE reported, then the UE may operate without knowing which pair is chosen. In such an implementation, the UE may not be expected to perform a dropping operation when it reported multiple pairs and when no implicit or explicit indication is provided by gNB.

Herein, for a reported pair (pdcch-BlindDetectionCA-R15, pdcch-BlindDetectionCA-R16), a maximum number of cells with per-slot limits ($N_{cells,slot}^{cap}$) is obtained from pdcch-BlindDetectionCA-R15, and a maximum number of cells with per-span limits ($N_{cells,span}^{cap}$) is obtained from pdcch-BlindDetectionCA-R16.

According to a first embodiment, the UE reports M≥1 pairs of (pdcch-BlindDetectionCA-R15, pdcch-BlindDetectionCA-R16) as $(Y_1, Z_1), \ldots, (Y_M, Z_M)$ to the gNB. The gNB explicitly indicates, via radio resource control (RRC), a pair $(Y_k, Z_k)$ from among the reported pairs. $N_{cells,slot}^{cap}$ is set as $Y_k$, and $N_{cells,span}^{cap}$ is set as $Z_k$. $N_{cells,slot}^{cap}$ is used to determine the BD/CCE limits per scheduled cell for the set of serving cells configured with per-slot monitoring. $N_{cells,span}^{cap}$ is used to determine the BD/CCE limits per scheduled cell for the set of serving cells configured with per-span monitoring.

For example, the UE reports M=3 pairs (1,3), (2,2) and (3,1). The gNB indicates the selection of (2,2) to the UE, via RRC. Therefore, the UE sets $N_{cells,slot}^{cap}=2$ and $N_{cells,span}^{cap}=2$.

Subsequently, the UE determines the BD/CCE limit per slot of a scheduling cell, for a scheduled cell, from the set of cells configured to perform per-slot monitoring, according to $N_{cells,slot}^{cap}=2$, a number of per-slot configured cells $N_{cell}^{DL,slot}$, a per-slot BD/CCE single-cell limit, a SCS configuration numerology of the scheduling cell μ, and/or a total number $N_{cell}^{DL,\mu}$ of scheduled cells that may be scheduled by a cell with the SCS configuration numerology μ.

Additionally, the UE determines the BD/CCE limit per span of a scheduling cell, for a scheduled cell, from the set of cells configured to perform per-span monitoring, according to $N_{cells,span}^{cap}=2$, a number of per-span configured cells $N_{cell}^{DL,span}$, a per-span BD/CCE single-cell limit, the SCS configuration numerology of the scheduling cell μ, and/or the total number $N_{cell}^{DL,\mu}$ of scheduled cells that may be scheduled by a cell with the SCS configuration numerology μ.

According to a second embodiment, the UE reports 3-tuple (pdcch-BlindDetectionCA-R15, pdcch-BlindDetectionCA-R16, pdcch-BlindDetectionCA-total_R15&R16) as (Y, Z, W) to the gNB, where max(Y, Z)≤W. The gNB indicates, via RRC, a pair (y, z), such that γ≤Y, z≤Z and γ+z≤W. $N_{cells,slot}^{cap}$ is set to γ and $N_{cells,span}^{cap}$ is set to z. $N_{cells,slot}^{cap}$ is used to determine the BD/CCE limit per scheduled cell for the set of serving cells configured with per-slot monitoring. $N_{cells,span}^{cap}$ is used to determine the BD/CCE limits per scheduled cell for the set of serving cells configured with per-span monitoring.

For example, the UE reports (Y, Z, W)=(3,3,5) to the gNB. The gNB indicates the pair (2,3) to the UE, via RRC. The UE then sets $N_{cells,slot}^{cap}=2$ and $N_{cells,span}^{cap}=3$, and determines BD/CCE per-slot and per-span limits, as described above.

As an alternative, the indication by the gNB may be provided by using a table. A first column in the table indicates an index, and a second column in the table indicates a corresponding pair starting at (γ, z)=(1,1). Subsequent pairs in the second column are listed in in ascending order of z for a given γ and ascending order of γ, such that γ≤Y, z≤Z, and γ+z≤W.

FIG. 4A is an RRC table corresponding to 3-tuple (Y, Z, W)=(2,3,4), according to an embodiment. If the UE reports (Y, Z, W)=(2,3,4) and the gNB indicates an index of 3, via RRC, the UE sets $N_{cells,slot}^{cap}=2$ and $N_{cells,span}^{cap}=1$ based on the table of FIG. 3A.

FIG. 4B is an RRC table corresponding to 3-tuple (Y, Z, W)=(3,3,4), according to an embodiment. As shown in FIG. 4B, if the UE reports (Y, Z, W)=(3,3,4) and the gNB indicates an index of 5, via RRC, the UE sets $N_{cells,slot}^{cap}=3$ and $N_{cells,span}^{cap}=1$ based on the table of FIG. 4B.

According to a third embodiment, the UE and the gNB share M sets $S_1, \ldots, S_M$. Each set includes one or more pairs (Y, Z). A given pair (Y, Z) may only appear in one of the sets. The UE reports an arbitrary pair (Y, Z) or a set index m∈{1, ..., M} to the gNB. Based on the arbitrary pair or the set index, the gNB is able to identify a set of pairs $S_m$. The gNB then indicates a pair (γ, z) in the identified set of pairs $S_m$, to the UE. The UE sets $N_{cells,slot}^{cap}=\gamma$ and $N_{cells,span}^{cap}=z$, and determines the BD/CCE per-slot and per-span limits, as described above.

According to a fourth embodiment, the UE reports a set S of pairs (Y, Z) or 3-tuples (Y, Z, W) to the gNB. The gNB configures $N_{Cells}^{DL,slot}$ cells with slot-based monitoring and $N_{cells}^{DL,span}$ cells with span-based monitoring. The UE implicitly determines $N_{cells,slot}^{cap}$ and $N_{cells,span}^{cap}$ based on the reported set S and the configured cells ($N_{Cells}^{DL,slot}$, $N_{cells}^{DL,span}$).

Specifically, the implicit determination is based on $(N_{cells,slot}^{cap}, N_{cells,span}^{cap}) = f(N_{Cells}^{DL,slot}, N_{Cells}^{DL,span}, S)$, where $f$ is a uniquely defined function shared between the UE and the gNB. The function $f$ may be implemented as a formula via a look-up table.

For example, if a UE reports a set having only a single 3-tuple as S={(3,3,4)}, and the gNB configures ($N_{Cells}^{DL,slot}$, $N_{Cells}^{DL,span}$)=(5,1) cells, then the UE determines that ($N_{cells,slot}^{cap}$, $N_{cells,span}^{cap}$)=(3,1). Specifically, (3,1)=$f$(5,1, S). As another example, if the gNB configures ($N_{Cells}^{DL,slot}$, $N_{Cells}^{DL,span}$)=(4,4) cells, then an implicit determination by UE results in ($N_{cells,slot}^{cap}$, $N_{cells,span}^{cap}$)=(2,2). Specifically, (2,2)=$f$(4,4, S).

In another example, if the UE reports multiple pairs $\{(Y_1, Z_1), (Y_2, Z_2), \ldots\}$, and $N_{Cells}^{DL,slot} \leq Y_i$ and $N_{Cells}^{DL,span} \leq Z_i$ for some value of i, then such $(Y_i, Z_i)$ may be chosen for ($N_{cells,slot}^{cap}$, $N_{cells,span}^{cap}$).

However, if $N_{Cells}^{DL,slot} > Y_i$ and $N_{Cells}^{DL,span} > Z_i$, then several rules may be considered for selecting ($N_{cells,slot}^{cap}$, $N_{cells,span}^{cap}$), based on $(Y_i, Z_i)$. Such rules include selection based on:

a largest $Y_i + Z_i$;
a smallest $(N_{Cells}^{DL,slot} - Y_i) + (N_{cells,span}^{cap} - Z_i)$ for $N_{Cells}^{DL,slot} \geq Y_i$ or $N_{cells,span}^{cap} \geq Z_i$;
a smallest max($N_{Cells}^{DL,slot} - Y_i$, 0)+max ($N_{cells,span}^{cap} - Z_i$, 0);
a smallest $(N_{cells,span}^{cap} - Z_i)$ for $N_{cells,span}^{cap} \geq Z_i$;
a smallest max($N_{cells,span}^{cap} - Z_i$, 0);
a smallest $(N_{Cells}^{DL,slot} - Y_i)$ for $N_{Cells}^{DL,slot} \geq Y_i$; and
a smallest max($N_{Cells}^{DL,slot} - Y_i$, 0).

As a further example, if the UE reports multiple 3-tuples $\{(Y_1, Z_1, W_1), (Y_2, Z_2, W_2), \ldots\}$, several rules may be considered for selecting ($N_{cells,slot}^{cap}$, $N_{cells,span}^{cap}$), based on (A, B) and $(Y_i, Z_i, W_i)$. Such rules include selection based on:

a largest $W_i$;

for $0 \leq A \leq Y_i$, $0 \leq B \leq Z_i$, $A+B \leq W_i$, a smallest $(N_{Cells}^{DL,slot}-A)+(N_{cells,span}^{cap}-B)$ for $N_{Cells}^{DL,slot} \geq A$ or $N_{cells,span}^{cap} \geq B$;

for $0 \leq A \leq Y_i$, $0 \leq B \leq Z_i$, $A+B \leq W_i$, a smallest $\max(N_{Cells}^{DL,slot}-A, 0)+\max(N_{cells,span}^{cap}-B, 0)$; a smallest $(N_{cells,span}^{cap}-Z_i)$ for $N_{cells,span}^{cap} \geq Z_i$;

a smallest $\max(N_{cells,span}^{cap}-Z_i, 0)$;

a smallest $(N_{Cells}^{DL,slot}-Y_i$; for $N_{Cells}^{DL,slot} \geq Y_i$; and a smallest $\max(N_{Cells}^{DL,slot}-Y_i, 0)$.

A network configuration may be restricted such that $N_{cells,slot}^{cap}=N_{Cells}^{DL,slot}$ and $N_{cells,span}^{cap}=N_{Cells}^{DL,span}$. In such a situation, a BD/CCE limit may be determined, for example, based on the number of configured cells. There may also be a restriction on the set S such that, for example, Y+Z or W for elements in the set is equal to the number of configurable cells.

According to a fifth embodiment, when the UE reports a set S of pair(s) (Y, Z), and the gNB configures $N_{Cells}^{DL,slot}$ Cells slot cells with slot-based monitoring and $N_{Cells}^{DL,span}$ cells with span-based monitoring, the UE determine s $N_{cells,slot}^{cap}$ and $N_{cells,span}^{cap}$ based on the reported set S and $(N_{Cells}^{DL,slot}, N_{Cells}^{DL,span})$ as set forth below.

Specifically, for each pair $(Y_i, Z_i)$ in the set S, a complexity metric is calculated as $\rho_i=Y_i+\alpha Z_i$. The complexity value corresponding to the configured cells is calculated as $\rho=N_{Cells}^{DL,slot}+\alpha N_{cells}^{DL,span}$. The pair $(Y_i, Z_i)$ with smallest value of $\rho-\rho_i$ is set as $(N_{cells,slot}^{cap}, N_{cells,span}^{cap})$. When there are multiple pairs $(Y_i, Z_i)$ with the smallest value, $(N_{cells,slot}^{cap}, N_{cells,span}^{cap})$ is chosen as the pair $(Y_i, Z_i)$ among the multiple pairs that minimizes $|N_{Cells}^{DL,slot}-Y_i|+|N_{cells,span}^{cap}-Z_i|$.

$\alpha$ may be either a fixed value or RRC configured for the UE. An exemplary value may be $\alpha=2$, which indicates that a cell with a Rel-16 (span-based) monitoring configuration has a PDCCH monitoring burden that is twice that of a Rel-15 (slot-based) monitoring configuration.

For example, a UE reports multiple pairs $S=\{(2,2), (1,3), (3,1), (1,4), (4,1)\}$, and the gNB configures $(N_{Cells}^{DL,slot}, N_{Cell}^{DL,span})=(5,5)$ cells. The value of $\rho=5+2\times5=15$, and the values of $\rho_i$ are:

$\rho(2,2)=6 \rho(1,3)=7 \rho(3,1)=5 \rho(1,4)=9$;;;; and $\rho(2,2)=6 \rho(1,3)=7 \rho(3,1)=5 \rho(1,4)=9$ $\rho(2,2)=6 \rho(1,3)=7 \rho(3,1)=5 \rho(1,4)=9$ $\rho(2,2)=6 \rho(1,3)=7 \rho(3,1)=5 \rho(1,4)=9$ $\rho(4,1)=6$.

Since the smallest value of $\rho-\rho_i$ is (15−9=6), $(N_{cells,slot}^{cap}, N_{cells,span}^{cap})=(1,4)$.

As another example, if a UE reports multiple pairs above, and gNB configures $(N_{Cells}^{DL,slot}, N_{Cells}^{DL,span})=(3,2)$ cells, the value of $\rho=3+2\times2=7$. Since the smallest value of $\rho-\rho_i$ is (7−7=0), $(N_{cells,slot}^{cap}, N_{cells,span}^{cap}))=(1,3)$.

When a UE is operating in DC, multiple combinations of (pdcch-BlindDetectionCA-R15, pdcch-BlindDetectionCA-R16) can be reported by a UE, as described above. Additionally, multiple combinations of (pdcch-BlindDetection-MCG-UE-R15, pdcch-BlindDetectionSCG-UE-R15, pdcch-BlindDetectionMCG-UE-R16, pdcch-BlindDetectionSCG-UE-R16) for both master and secondary cell groups in each of rel-15 and rel-16 monitoring can be reported by the UE, based on the relationships defined by Equations (2) and (3) below.

$$\text{pdcch-BlindDetectionMCG-}UE\text{-}R15+\text{pdcch-BlindDetectionSCG-}UE\text{-}R15 >= \text{pdcch-BlindDetectionCA-}R15 \quad (2)$$

$$\text{pdcch-BlindDetectionMCG-}UE\text{-}R16+\text{pdcch-BlindDetectionSCG-}UE\text{-}R16 >= \text{pdcch-BlindDetectionCA-}R16 \quad (3)$$

If a UE reports 2 combinations of (pdcch-BlindDetectionCA-R15, pdcch-BlindDetectionCA-R16) as $((Y_1, Z_1), (Y_2, Z_2))$, then a UE may also report 2 combinations of (pdcch-BlindDetectionMCG-UE-R15, pdcch-BlindDetectionSCG-UE-R15, pdcch-BlindDetectionMCG-UE-R16, pdcch-BlindDetectionSCG-UE-R16) as $((A_1, B_1, C_1, D_1), (A_2, B_2, C_2, D_2))$ to satisfy $A_i+B_i \geq Y_i$ and $C_i+D_i \geq Z_i$. Further, an $n^{th}$ pair in the first set of combinations and an $n^{th}$ tuple in the second set of combinations act together. For example, the $n^{th}$ pair in the first set of combinations provides a number of cells a UE supports for per-slot and per-span monitoring across all cell groups. Additionally, the $n^{th}$ tuple in the second set of combinations provides an additional condition per cell group regarding the number of cells the UE supports for per-slot and per-span monitoring (on top of the values provided in the $n^{th}$ pair of the first set of combinations).

When a UE reports fewer combinations of (pdcch-BlindDetectionMCG-UE-R15, pdcch-BlindDetectionSCG-UE-R15, pdcch-BlindDetectionMCG-UE-R16, pdcch-BlindDetectionSCG-UE-R16) $(A_j, B_j, C_j, D_j)$ than combinations of (pdcch-BlindDetectionCA-R15, pdcch-BlindDetectionCA-R16) $(Y_i, Z_i)$, then the combinations satisfy the conditions $A_j+B_j \geq Y_i$ and $C_j+D_j \geq Z_i$ for all i and j. For example, a UE may report a single combination (A, B, C, D) that satisfies $A+B \geq Y_i$ and $C+D \geq Z_i$ for all i.

Alternatively, when a UE reports fewer combinations of (pdcch-BlindDetectionMCG-UE-R15, pdcch-BlindDetectionSCG-UE-R15, pdcch-BlindDetectionMCG-UE-R16, pdcch-BlindDetectionSCG-UE-R16) $(A_j, B_j, C_j, D_j)$ than combinations of (pdcch-BlindDetectionCA-R15, pdcch-BlindDetectionCA-R16) $(Y_i, Z_i)$, then the combinations satisfy the conditions of $A_j+B_j \geq Y_i$ and $C_j+D_j \geq Z_i$ for some i and j. A network may select an appropriate i and j to configure proper monitoring between cell groups. For example, a UE may report a single combination (A, B, C, D) that satisfies $A+B \geq Y_i$ and $C+D \geq Z_i$ for some i.

Figure 5:
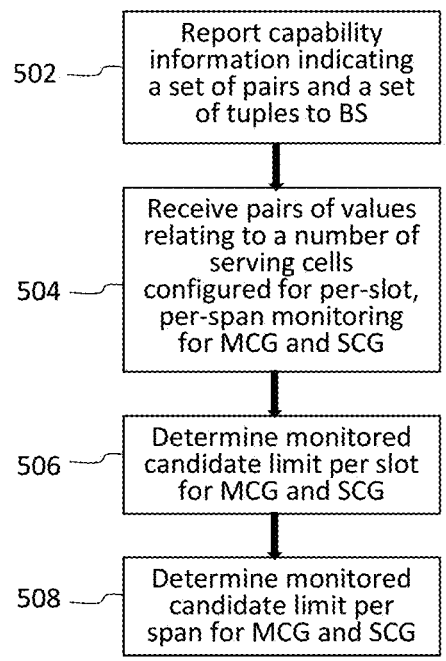
FIG. 5 is a flowchart illustrating a method for monitoring a PDCCH by a UE, according to an embodiment.

Referring to FIG. 5, a flowchart illustrates a method for monitoring a PDCCH, by a UE, according to an embodiment. At 502, the UE reports, to a BS, capability information indicating a first set of one or more pairs and a second set of one or more tuples. Each pair indicates a combination of serving cells configured for per-slot and per-span monitoring that the UE is capable of supporting. Each tuple of the second set indicates a combination of serving cells configured for per-slot and per-span monitoring that the UE is capable of supporting in each of a master cell group and a secondary cell group.

Each pair of the first set includes a first value indicating a number of serving cells configured for per-slot monitoring and a second value indicating a number of serving cells configured for per-span monitoring. Each tuple of the second set includes a first value indicating a number of serving cells configured for per-slot monitoring in the master cell group, a second value indicating a number of serving cells configured for per-slot monitoring in the secondary cell group, a third value indicating a number of serving cells configured for per-span monitoring in the master cell group, and a fourth value indicating a number of serving cells configured for per-span monitoring in the secondary cell group.

A number of the one or more pairs in the first set may be equal to a number of one or more tuples in the second set. When a number of the one or more pairs in the first set is greater than a number of the one or more tuples in the second set, a first sum of the first and second values of a given tuple of the second set is greater than or equal to the first value of some or all pairs in the first set, and a second sum of the third and fourth values of the given tuple of the second set is greater than or equal to the second value of the some or all pairs in the first set.

Referring back to FIG. 5, at 504, the UE receives a first pair of values for the MCG and a second pair of values for the SCG, from the BS, in response to the capability information. A first value in each of the first and second pairs of values is a maximum number of serving cells configured for per-slot monitoring in a respective cell group, and a second value in each of the first and second pairs of values is a maximum number of serving cells configured for per-span monitoring in the respective cell group.

At 506, the UE determines a monitored candidate limit per slot for each of the MCG and the SCG based on the first value each of the first and second pairs of values. At 508, the UE determines a monitored candidate limit per span for each of the MCG and the SCG based on the second value in each of the first and second pairs of values.

The monitored candidate limit per slot is determined based also on a number of cells configured for per-slot monitoring in the respective cell group, a per-slot candidate single cell limit, an SCS configuration, and a number of cells scheduled with the SCS configuration.

The monitored candidate limit per span is determined based also on a number of cells configured for per-span monitoring in the respective cell group, a per-span candidate single cell limit, an SCS configuration, and a number of cells scheduled with the SCS configuration.

Figure 6:
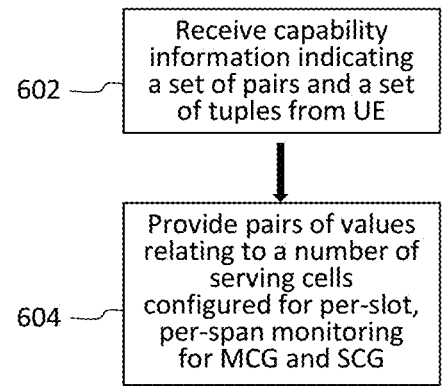
FIG. 6 is a flowchart illustrating a method for monitoring a PDCCH by a BS, according to an embodiment.

Referring to FIG. 6, a flowchart illustrates a method for monitoring a PDCCH, by a BS, according to an embodiment. At 602, the BS receives capability information indicating a first set of one or more pairs and a second set of one or more tuples, from the UE. Each pair indicates a combination of serving cells configured for per-slot and per-span monitoring that the UE is capable of supporting. Each tuple indicates a combination of serving cells configured for per-slot and per-span monitoring that the UE is capable of supporting in each of a master cell group and a secondary cell group.

Each pair of the first set includes a first value indicating a number of serving cells configured for per-slot monitoring and a second value indicating a number of serving cells configured for per-span monitoring. Each tuple of the second set includes a first value indicating a number of serving cells configured for per-slot monitoring in the master cell group, a second value indicating a number of serving cells configured for per-slot monitoring in the secondary cell group, a third value indicating a number of serving cells configured for per-span monitoring in the master cell group, and a fourth value indicating a number of serving cells configured for per-span monitoring in the secondary cell group.

A number of the one or more pairs in the first set may be equal to a number of one or more tuples in the second set. When a number of the one or more pairs in the first set is greater than a number of the one or more tuples in the second set, a first sum of the first and second values of a given tuple of the second set is greater than or equal to the first value of some or all pairs in the first set, and a second sum of the third and fourth values of the given tuple of the second set is greater than or equal to the second value of the some or all pairs in the first set.

At 604, the BS provides a first pair of values for the MCT and a second pair of values for the SCG, in response to the capability information. A first value in each of the first and second pairs of values is maximum number of serving cells configured for per-slot monitoring in a respective cell group, and a second value in each of the first and second pairs of values is a maximum number of serving cells configured for per-span monitoring in the respective cell group. A monitored candidate limit per slot for each of the MCG and the SCG is determined based on the first value in the pair of values, and a monitored candidate limit per span for each of the MCG and the SCG is determined based on the second value in the pair of values.

In some embodiments described above, UE capability signaling is based on a UE reporting multiple tuples of (Y, Z) or (Y, Z, W). The UE may report its capability to perform certain features in any scenario (i.e., on a per-UE basis), in particular bands (i.e., on a per-band basis), in particular band combinations for CA (i.e., on a per-bandcombination or per-BC basis), in specific bands in particular band combinations for CA (i.e., on a per-featureSet or per-FS basis), or in specific component carrier(s) (CC) in particular band combinations for CA (i.e., on a perleatureSet per cc or per-FSPC basis).

In one or more of the above-described examples, a band combination may include a collection of bands to represent a CA configuration. Depending on implementation details, when proceeding from the first item to the last item in the reporting examples above, a UE's flexibility for declaring support of certain features may increase. For example, if a UE reports its capability to perform feature A and feature B on a per-FSPC basis, the UE may have full flexibility of supporting only one of feature A or B in some or all CCs. However, if the UE reports its capability to perform the same features on a per-UE basis, then the UE may need to support or not support the features. Some embodiments may involve a trade-off relating to added flexibility and/or signaling overhead. Hence, a determination of how a certain feature is declared provide insight into the complexity of the feature in UE implementation and/or associated signaling overhead.

A UE reporting its capability via multiple tuples on a per-UE basis, reports a list of tuples. A UE reporting its capability via multiple tuples on a per-BC basis, reports a list of tuples for one or more BCs. This may allow a UE to signal a varying list for one or more BC with larger signaling overhead.

When reporting on a per-FS or per-FSPC basis, reporting a tuple (Y, Z) or (Y, Z, W) corresponding to the number of cells may be contradictory and/or incompatible, because those tuples may be intended to be applied to all bands or CCs in the band combination. This may be rectified by using a functional relationship $g((Y_1, Z_1), (Y_2, Z_2), \ldots)$ or $g((Y_1, Z_1, W_1), (Y_2, Z_2, W_2), \ldots)$ to determine the applied tuple. One possible such relationship may be to interpret multiple (Y, Z) or (Y, Z, W) reported for bands or for cells in some or all feature sets as possible supported tuples across some or all CC's in the corresponding band combination by a UE. Another possible relationship may be to consider a maximum or minimum value of linear combinations of $Y_i, Z_i, W_i$ such as $Z_i, W_i, Y_i+Z_i$ to determine the applied tuple.

Additionally or alternatively, further restrictions on reporting may be applied. One such restriction may be requiring a UE to report the same (Y, Z) or (Y, Z, W) for some or all bands or for some or all cells for one or more feature sets. In such an embodiment, this same value may be supported across some or all CCs in the corresponding band combination. Another possible interpretation and restriction may be to let a UE report a tuple (Y, Z) or (Y, Z, W) at least for one band or CC while requiring the same (Y, Z) or (Y, Z, W) for some or all bands or for some or all cells in which those tuples are reported for one or more feature sets. In such an embodiment, this same value may be supported across all CCs in the corresponding band combination. Another possible restriction may be for a UE to have some functional relationship among elements on one or more tuples. For example, one such relationship may be $Y_i = \alpha Z_i + b$. Depending on the implementation, the scalar a or offset b may represent a higher complexity of span-based monitoring than slot-based monitoring.

A benefit of utilizing per-FS or per-FSPC may be the natural allowance of multiple reportings. Specifically, some embodiments may be implemented without constructing an explicit list similar to embodiments relating to a per-UE or per-BC basis described above.

If a UE reports a tuple (Y, Z) or (Y, Z, W) (or a combination of them) as per-band, then for the purpose of CA BD/CEE limit (e.g. BD/CCE limit hard splitting) the tuple (or a combination of them) reported for the band and/or the number of cells configured to the UE in the band may be used to determine the CA BD/CCE limit for the configured cells in the band.

If a UE reports a tuple (Y, Z) or (Y, Z, W) (or a combination of them) as per-BC, then for the purpose of CA BD/CEE limit (e.g. BD/CCE limit hard splitting) the tuple (or a combination of them) reported for the band combination and/or the number of cells configured to the UE in all the bands of the band combination may be used to determine the CA BD/CCE limit.

If a UE reports a tuple (Y, Z) or (Y, Z, W) (or a combination of them) as per-FS, then for the purpose of CA BD/CEE limit (e.g. BD/CCE limit hard splitting) the tuple (or a combination of them) reported for the band in the band combination and/or the number of cells configured to the UE in the specific band in the band combination may be used to determine the CA BD/CCE limit for the configured cells in the band in the band combination.

If a UE reports a tuple (Y, Z) or (Y, Z, W) (or a combination of them) as per-FS, then for the purpose of CA BD/CEE limit (e.g. BD/CCE limit hard splitting), $\Sigma Y_i$, $\Sigma Z_i$, $\Sigma W_i$ may be used to determine the CA BD/CCE limit, where index i corresponds to a band in the band combination and the number of cells configured to the UE.

Due to the complexity of Rel-16 per-span monitoring, some embodiments may implement one or more further optimizations of reporting a tuple (Y, Z) or (Y, Z, W). For example, in Rel-15 3GPP, there may be multiple different UE slot-based PDCCH monitoring behaviors, as described below. For example, there may be feature groups FG3-1, 3-2, 3-5, 3-5a, 3-5b for different UE monitoring behavior. A UE may report a tuple (Y, Z) or (Y, Z, W) (or a list of them) for one or more different slot-based monitoring configurations FG3-1, 3-2, 3-5, 3-3-5b separately. In such an embodiment, a UE determines a tuple to be applied based on a network configuration.

In some embodiments, an explicit indication may be received from a network that indicates FG3-1, 3-2, 3-5, 3-5a, 3-5b per-component carrier (CC), per-cell group, and/or per-UE manner.

In some embodiments, a UE may check if the current configuration satisfies FG3-1, 3-2, 3-5, 3-5a, 3-5b, and implicitly determine the applied FG. If multiple FGs are satisfied by the configuration, then a single FG may be determined by a rule or guideline. Such a rule or guideline may be pre-determined or indicated by a network. Such a rule or guideline may be based on a complexity order, such as, for example, FG3-1, 3-2, 3-5a, 3-5b, 3-5 from low to high, and the lowest complexity FG may be selected. If the lowest complexity FG is selected, then it may likely correspond to the largest Y and may be beneficial for system deployment. Alternatively, the highest complexity FG may be selected, and in such an embodiment, a UE complexity may be reduced, and in some implementations, minimized.

For one or more band combinations, there may be a mixture of FG3-1, 3-2, 3-5, 3-3-5b for slot-based monitoring from network configuration. If there is no such mixture (i.e., if some or all cells configured with slot-based monitoring correspond to the same FG), then the first through fifth embodiments described above may be applied when a tuple (Y, Z) or (Y, Z, W) is reported for some or all of FG3-1, 3-2, 3-5, 3-5a, 3-5b.

In some embodiments, an explicit indication may be received from a network to indicate FG3-1, 3-2, 3-5, 3-5a, 3-5b for determination of a tuple.

In some embodiments, a UE may check if the current configuration satisfies which mixture of FG3-1, 3-2, 3-5, 3-5a, 3-5b, and implicitly determine the applied tuple by a rule. Such a rule or guideline, for example may be pre-determined and/or indicated by a network.

The above-described rule may be based on a complexity order, such as, for example, FG3-1, 3-2, 3-5a, 3-5b, 3-5 from low to high, and the tuple corresponding to the highest complexity FG may be selected. In such an embodiment, and depending on the implementation details, a UE complexity may be reduced or minimized. Similarly, the rule may be based on a low or lowest number Y. Since the UE's overall complexity may also depend on per-span monitoring, such a rule or guideline may be based on a low or lowest number Y+Z or W. In some embodiments, a UE's complexity may be dominated by span-based monitoring, and the rule or guideline may be based on a low or lowest number Z.

In some embodiments, the rule or guideline may be based on a high or highest number Y among a mixture. Since overall system flexibility may also depend on per-span monitoring, the rule may also be based on a high or highest number Y+Z or W. In some embodiments, for example, where system flexibility on span-based monitoring may be more important, such a rule or guideline may be based on a high or highest number Z.

Figure 7:
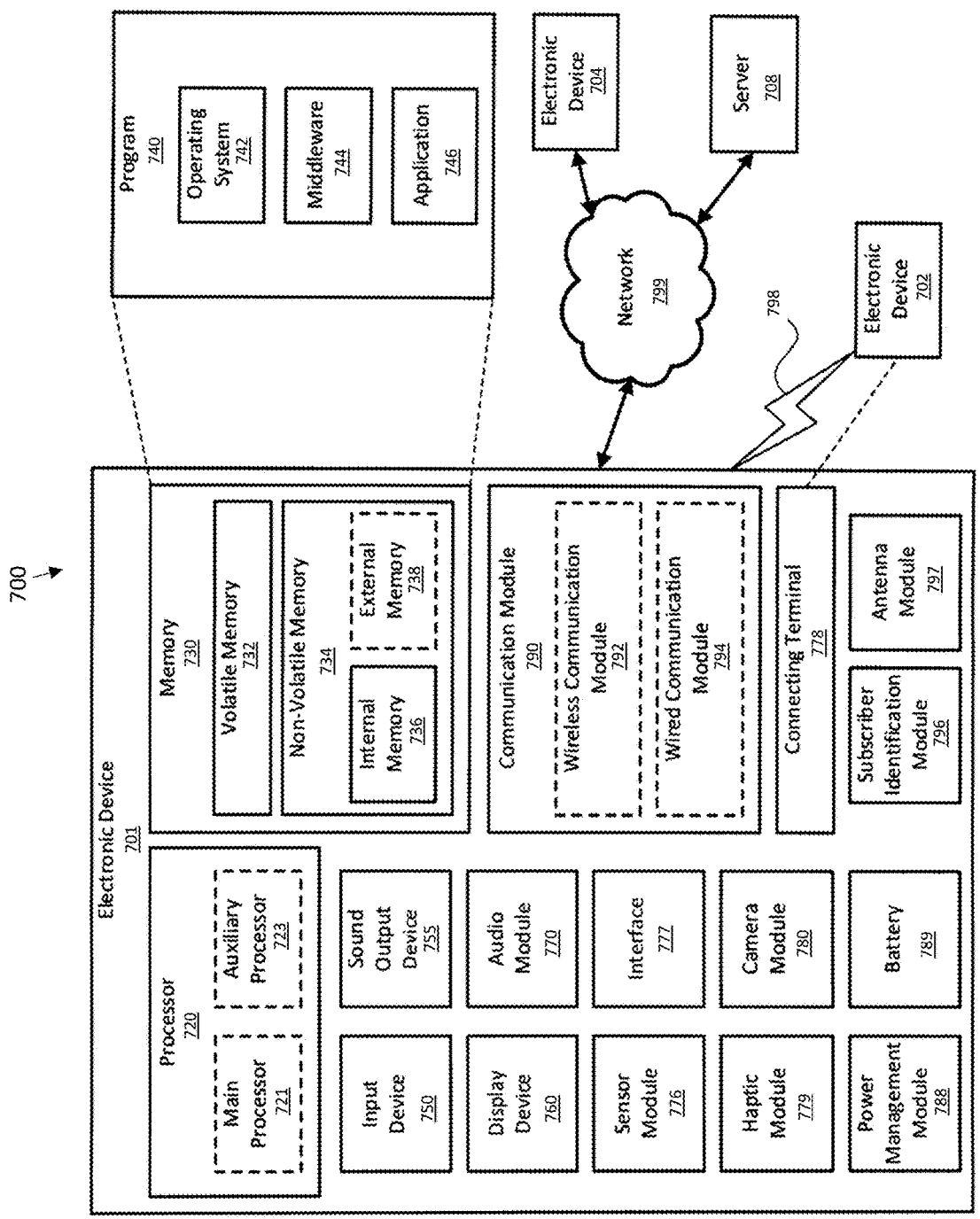
FIG. 7 is a block diagram of an electronic device in a network environment, according to an embodiment.

FIG. 7 is a block diagram of an electronic device in a network environment, according to one embodiment. Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an ISP or a CP) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, ISPs, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more CPs that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for monitoring a physical downlink control channel (PDCCH) by a user equipment (UE), the method comprising:

reporting capability information indicating a first set of one or more pairs and a second set of one or more tuples, wherein each pair of the first set indicates a combination of serving cells configured for per-slot and per-span monitoring that the UE is capable of supporting, and each tuple of the second set indicates a combination of serving cells configured for per-slot and per-span monitoring that the UE is capable of supporting in each of a master cell group (MCG) and a secondary cell group (SCG);

receiving, in response to the capability information, a first pair of values for the MCG and a second pair of values for the SCG, wherein a first value in each of the first and second pairs of values is a maximum number of serving cells configured for per-slot monitoring, and a second value in each of the first and second pairs of values is a maximum number of serving cells configured for per-span monitoring;

determining, for each of the MCG and the SCG, a monitored candidate limit per slot based on the first value in each of the first and second pairs of values; and determining, for each of the MCG and the SCG, a monitored candidate limit per span based on the second value in each of the first and second pairs of values.

2. The method of claim 1, wherein:

each pair of the first set comprises a first value indicating a number of serving cells configured for per-slot monitoring and a second value indicating a number of serving cells configured for per-span monitoring across cell groups; and each tuple of the second set comprises a first value indicating a number of serving cells configured for per-slot monitoring in the MCG, a second value indicating a number of serving cells configured for per-slot monitoring in the SCG, a third value indicating a number of serving cells configured for per-span monitoring in the MCG, and a fourth value indicating a number of serving cells configured for per-span monitoring in the SCG.

3. The method of claim 2, wherein a number of the one or more pairs in the first set is equal to a number of the one or more tuples in the second set.

4. The method of claim 3, wherein an $n^{th}$ pair of the first set and an $n^{th}$ tuple of the second set are used in combination to determine a number of serving cells configured for per-slot and per-span monitoring for each of the MCG and SCG.

5. The method of claim 2, wherein, when a number of the one or more pairs in the first set is greater than a number of the one or more tuples in the second set, a first sum of the first and second values of a given tuple of the second set is greater than or equal to the first value of at least one pair in the first set, and a second sum of the third and fourth values of the given tuple of the second set is greater than or equal to the second value of the at least one pair in the first set.

6. The method of claim 5, wherein the given tuple and a number of the at least one pair are predetermined for proper monitoring between the MCG and the SCG.

7. The method of claim 5, wherein the at least one pair of the first set comprises every pair of the first set.

8. The method of claim 1, wherein:

the monitored candidate limit per slot is determined based on a number of cells configured for per-slot monitoring, a per-slot candidate single cell limit, a subcarrier spacing (SCS) configuration, and a number of cells scheduled with the SCS configuration; and the monitored candidate limit per span is determined based on a number of cells configured for per-span monitoring, a per-span candidate single cell limit, an SCS configuration, and the number of cells scheduled with the SCS configuration.

9. The method of claim 1, wherein the capability information is reported on at least one of a per-UE basis, a per-band basis, a per-band combination basis, a per-feature set basis, a per-feature set, per-component carrier basis.

10. The method of claim 1, wherein reporting the capability information comprises:

determining a plurality of feature groups for a monitoring behavior of the UE;

determining a feature group from the plurality of feature groups based on a predetermined guideline; and reporting the capability information for the determined feature group.

11. A method for monitoring a physical downlink control channel (PDCCH), by a base station (BS), the method comprising:

receiving, from a user equipment (UE), capability information indicating a first set of one or more pairs and a second set of one or more tuples, wherein each pair of the first set indicates a combination of serving cells configured for per-slot and per-span monitoring that the UE is capable of supporting, and each tuple of the second set indicates a combination of serving cells configured for per-slot and per-span monitoring that the UE is capable of supporting in each of a master cell group (MCG) and a secondary cell group (SCG); and providing a first pair of values for the MCG and a second pair of values for the SCG, in response to the capability information, wherein a first value in each of the first and second pairs of values is a maximum number of serving cells configured for per-slot monitoring, and a second value in each of the first and second pairs of values is a maximum number of serving cells configured for per-span monitoring, wherein a monitored candidate limit per slot is determined for each of the MCG and the SCG based on the first value in each of the first and second pairs of values, and wherein a monitored candidate limit per span is determined for each of the MCG and the SCG based on the second value in each of the first and second pairs of values.

12. The method of claim 11, wherein:

each pair of the first set comprises a first value indicating a number of serving cells configured for per-slot monitoring and a second value indicating a number of serving cells configured for per-span monitoring across cell groups; and each tuple of the second set comprises a first value indicating a number of serving cells configured for per-slot monitoring in the MCG, a second value indicating a number of serving cells configured for per-slot monitoring in the SCG, a third value indicating a number of serving cells configured for per-span monitoring in the MCG, and a fourth value indicating a number of serving cells configured for per-span monitoring in the SCG.

13. The method of claim 12, wherein a number of the one or more pairs in the first set is equal to a number of the one or more tuples in the second set.

14. The method of claim 13, wherein an nth pair of the first set and an nth tuple of the second set are used in combination to determine a number of serving cells configured for per-slot and per-span monitoring for each of the MCG and the SCG.

15. The method of claim 12, wherein, when a number of the one or more pairs in the first set is greater than a number of the one or more tuples in the second set, a first sum of the first and second values of a given tuple of the second set is greater than or equal to the first value of at least one pair in the first set, and a second sum of the third and fourth values of the given tuple of the second set is greater than or equal to the second value of the at least one pair in the first set.

16. The method of claim 15, wherein the given tuple and a number of the at least one pair is predetermined for proper monitoring between the MCG and the SCG.

17. The method of claim 15, wherein the at least one pair of the first set comprises every pair of the first set.

18. The method of claim 11, wherein:
the monitored candidate limit per slot is determined based on a number of cells configured for per-slot monitoring, a per-slot candidate single cell limit, a subcarrier spacing (SCS) configuration, and a number of cells scheduled with the SCS configuration; and
the monitored candidate limit per span is determined based on a number of cells configured for per-span monitoring, a per-span candidate single cell limit, an SCS configuration, and a number of cells scheduled with the SCS configuration.

19. A user equipment (UE) comprising:
a processor; and
a non-transitory computer readable storage medium storing instructions that, when executed, cause the processor to:
report capability information indicating a first set of one or more pairs and a second set of one or more tuples, wherein each pair of the first set indicates a combination of serving cells configured for per-slot and per-span monitoring that the UE is capable of supporting, and each tuple of the second set indicates a combination of serving cells configured for per-slot and per-span monitoring that the UE is capable of supporting in each of a master cell group (MCG) and a secondary cell group (SCG);
receive, in response to the capability information, a first pair of values for the MCG and a second pair of values for the SCG, wherein a first value in each of the first and second pairs of values is a maximum number of serving cells configured for per-slot monitoring, and a second value in each of the first and second pairs of values is a maximum number of serving cells configured for per-span monitoring;
determine, for each of the MCG and the SCG, a monitored candidate limit per slot based on the first value in each of the first and second pairs of values; and
determine, for each of the MCG and the SCG, a monitored candidate limit per span based on the second value in each of the first and second pairs of values.

20. A base station (BS) comprising:
a processor; and
a non-transitory computer readable storage medium storing instructions that, when executed, cause the processor to:
receive, from a user equipment (UE), capability information indicating a first set of one or more pairs and a second set of one or more tuples, wherein each pair of the first set indicates a combination of serving cells configured for per-slot and per-span monitoring that the UE is capable of supporting, and each tuple of the second set indicates a combination of serving cells configured for per-slot and per-span monitoring that the UE is capable of supporting in each of a master cell group (MCG) and a secondary cell group (SCG); and
provide a first pair of values for the MCG and a second pair of values for the SCG, in response to the capability information, wherein a first value in each of the first and second pairs of values is a maximum number of serving cells configured for per-slot monitoring, and a second value in each of the first and second pairs of values is a maximum number of serving cells configured for per-span monitoring,
wherein a monitored candidate limit per slot is determined for each of the MCG and the SCG based on the first value in each of the first and second pairs of values, and
wherein a monitored candidate limit per span is determined for each of the MCG and the SCG based on the second value in each of the first and second pairs of values.

21. A method for monitoring a physical downlink control channel (PDCCH) by a user equipment (UE), the method comprising:
reporting capability information indicating a set of one or more tuples, wherein each tuple of the set indicates a combination of serving cells configured for per-slot and per-span monitoring that the UE is capable of supporting in each of a master cell group (MCG) and a secondary cell group (SCG);
receiving, in response to the capability information, a first pair of values for the MCG and a second pair of values for the SCG, wherein a first value in each of the first and second pairs of values is a maximum number of serving cells configured for per-slot monitoring, and a second value in each of the first and second pairs of values is a maximum number of serving cells configured for per-span monitoring;
determining, for each of the MCG and the SCG, a monitored candidate limit per slot based on the first value in each of the first and second pairs of values; and
determining, for each of the MCG and the SCG, a monitored candidate limit per span based on the second value in each of the first and second pairs of values.

* * * * *